United States Patent Office 3,490,881
Patented Jan. 20, 1970

3,490,881
URANIUM OXIDE FLUORINATION WITH FLUORINE AND FLUORINE INTERHALOGENS
John T. Holmes, Downers Grove, Donald R. Vissers, Naperville, and John D. Gabor, Western Springs, Ill., and Irving E. Knudsen, Murrysville, Pa., assignors to the United States of America as represented by the United States Atomic Energy Commission
No Drawing. Filed Aug. 27, 1968, Ser. No. 755,718
Int. Cl. C01g 56/00
U.S. Cl. 23—326                  4 Claims

ABSTRACT OF THE DISCLOSURE

Uranium oxides are fluorinated to the hexafluoride with dilute fluorine gas and catalytic amounts of fluorine interhalogens at temperatures of about 200° C.

BACKGROUND OF THE INVENTION

This invention relates to the fluorination of uranium oxides and more particularly to the production of uranium hexafluoride from $U_3O_8$.

A fluoride volatility process is being developed to reprocess spent nuclear fuels in which a fuel, such as uranium dioxide, is converted to the volatile hexafluoride and thereafter purified. Because irradiated nuclear fuels are intensively radioactive, they must be handled remotely in a place protected by great amounts of shielding. Limiting the number of process steps and simplifying the equipment maintenance are two major goals in the design of a fluoride volatility process.

Bromine pentafluoride, bromine trifluoride and elemental fluorine gas have all been used as fluorinating agents to convert uranium dioxide or $U_3O_8$ to the hexafluoride. Use of elemental fluorine as the principal fluorinating agent requires reaction temperatures in excess of 300° C. Because of the corrosive nature of the reactants, it is desirable to keep the operating temperature as low as possible. As reported in U.S. Patent 3,294,493, use of a fluorine interhalogen, such as bromine pentafluoride or bromine trifluoride, permits fluorination of $U_3O_8$ at low temperatures. The cost of the aforementioned interhalogens necessitates recovery of the used interhalogen by a separate oxidation, and an additional process step to separate the reaction product from the interhalogen is required.

SUMMARY OF THE INVENTION

It has been discovered that uranium dioxide or $U_3O_8$ can be fluorinated to uranium hexafluoride by the action of elemental fluorine gas with catalytic amounts of a fluorine interhalogen at temperatures of about 200° C. By using the interhalogen as a catalyst, the benefits of lower reaction temperatures are retained without the use of large amounts of the interhalogen. Besides being cheaper, the use of small amounts of the interhalogens obviates the need for large-scale separation of the interhalogens from the uranium hexafluoride reaction product.

In the case where bromine pentafluoride is the fluorine interhalogen, the following reactions most likely describe the fluorination:

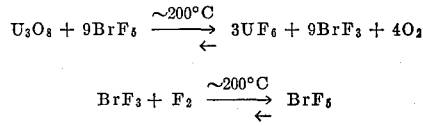

$$BrF_3 + F_2 \underset{\leftarrow}{\overset{\sim 200°C}{\longrightarrow}} BrF_5$$

While the bromine pentafluoride enters the fluorination reaction it is replenished by reaction with the fluorine gas present. Other fluoride interhalogens such as bromine trifluoride, chlorine trifluoride and iodine heptafluoride behave similarly.

The invention may better be explained by reference to the following experiments. The experiments are conducted in a fluidized bed of alumina in a 1.5 inch column. The fluidized bed in each case consists of 470 grams of 48 to 100 mesh alumina and 270 grams of uranium dioxide pellets from 0.43 to 0.50" in diameter by 0.43 to 0.50" long. The pellet bed depth is 1" and the fluid bed depth at static conditions is 7". The column is operated at atmospheric pressure and a diluent gas of nitrogen is used with the reactant gases. In all cases the uranium dioxide pellets are oxidized to $U_3O_8$ by passing a 30 volume-percent oxygen-containing gas through the bed for 3 hours while maintaining the bed at temperatures from 400° C. to 460° C.

Experiments 1 and 2

Streams comprising 2.0 and 2.6 volume-percent bromine pentafluoride in nitrogen are passed through the beds at a velocity of about 0.50 feet per second for 2 hours while the beds are maintained at a temperature of 200° C. The amount of uranium hexafluoride produced in both experiments is small. In the first experiment about 53 grams of uranium hexafluoride is produced and in the second experiment about 18 grams of hexafluoride is produced.

Experiments 3, 4 and 5

Streams comprising 13.4, 12.8 and 12.8 volume-percent fluorine in nitrogen are passed through the beds at a velocity of 0.55 feet per second for 2 hours while the beds are maintained at a temperature of about 200° C. The amount of uranium hexafluoride produced in each experiment is 75 grams, 0 gram and 1 gram respectively.

Experiments 6, 7 and 8

Streams comprising 1.53, 2.1 and 2.2 volume-percent bromine pentafluoride and 13.2, 12.5 and 12.5 volume-percent fluorine respectively are passed with a nitrogen diluent through the beds at a velocity of 0.50 to 0.56 feet per second for 2 hours. The beds are maintained at 200° C. The amounts of uranium hexafluoride produced are 238 grams, 238 grams and 230 grams respectively.

Experiments 9, 10 and 11

Experiments 1 and 2 are repeated substituting bromine trifluoride, chlorine trifluoride and iodine heptafluoride respectively. In each case only minor amounts of uranium hexafluoride are produced.

Experiments 12, 13 and 14

Experiments 6, 7 and 8 are repeated substituting mixtures of bromine trifluoride and elemental fluorine; mixtures of fluorine trifluoride and elemental fluorine; and mixtures of iodine heptafluoride and elemental fluorine for bromine pentafluoride and elemental fluorine in the aforementioned experiments. In all cases the combination of elemental fluorine and a fluorine interhalogen produces substantial amounts of uranium hexafluoride at temperatures as low as 200° C.

While in all the experiments reported above the uranium dioxide was oxidized to $U_3O_8$ prior to the fluorination, it is believed that the fluorinations could successfully be accomplished with uranium dioxide if the uranium dioxide has substantial surface area. The uranium dioxide is generally received for laboratory use as a pellet with a small surface area. During oxidation to $U_3O_8$ the pellet is pulverized which provides a convenient method for increasing the surface area.

Clearly, the reactions may take place at temperatures in excess of 250° C. or where the fluorine interhalogens are present in amounts over 3 volume percent but the objects of this invention are obtained by operating at the lowest temperature and interhalogen concentration possible. Because of the large surface of $U_3O_8$ it is preferred as are temperatures of about 200° C. and interhalogen concentrations of 2 volume percent.

Reference to the above experiments shows that the reaction between $U_3O_8$ and low concentrations of the fluorine interhalogens at 200° C. is very slow and does not produce significant amounts of uranium hexafluoride. The same is true where fluorine is present in amounts less than about 20 volume percent at temperatures about 200° C. While neither reactant alone produces significant reactions with $U_3O_8$, a combination of less than 20 volume-percent fluorine and less than 3 volume percent of a fluorine interhalogen produces a substantial chemical reaction with $U_3O_8$ at 200° C. The synergistic effect of small amounts of fluorine interhalogens on the chemical reaction between diluted fluorine gas and $U_3O_8$ at low temperatures is the basis for this invention.

It will be understood that the invention is not to be limited to the details herein but that it may be modified within the scope of the appended claims.

The embodiments of the invention in which an exclusive property or privilege is claimed are defined as follows:

1. A method of forming $UF_6$ from uranium oxides comprising reacting said oxides with less than 20 volume percent fluorine and less than 3 volume percent of a bromine fluoride at a temperature of about 200° C.

2. The method of claim 1 wherein the uranium oxide is $U_3O_8$ and the bromine fluoride is $BrF_5$.

3. The method of claim 2 wherein the $BrF_5$ is present in amounts of about 2 volume percent.

4. A method of forming $UF_6$ from $UO_2$ comprising oxidizing the $UO_2$ to $U_3O_8$ and reacting the $U_3O_8$ with a gas containing less than 20 volume percent of fluorine and less than about 3 volume percent of $BrF_5$ at a temperature of about 200° C.

References Cited

UNITED STATES PATENTS

| 3,340,019 | 9/1967 | Pierini et al. | 23—352 |
| 3,294,493 | 12/1966 | Jonke et al. | 23—353 |

OTHER REFERENCES

Barhusen: Volatility Processes, Reactor and Fuel Processing Technology, vol. 10, #3, pp. 227–230, November 1967.

BENJAMIN R. PADGETT, Primary Examiner

F. M. GITTES, Assistant Examiner

U.S. Cl. X.R.

23—352